(12) United States Patent
Faitel et al.

(10) Patent No.: US 8,769,788 B2
(45) Date of Patent: Jul. 8, 2014

(54) RIVET MACHINE

(75) Inventors: William M. Faitel, New Baltimore, MI (US); Robert W. Weaver, Jr., North Street, MI (US)

(73) Assignee: BTM Corporation, Marysville, MI (US)

( * ) Notice: Subject to any disclaimer, the term of this patent is extended or adjusted under 35 U.S.C. 154(b) by 530 days.

(21) Appl. No.: 13/162,974

(22) Filed: Jun. 17, 2011

(65) Prior Publication Data

US 2012/0317766 A1 Dec. 20, 2012

(51) Int. Cl.
*B23P 11/00* (2006.01)
*B23P 19/02* (2006.01)
*B23P 19/00* (2006.01)

(52) U.S. Cl.
CPC .............. *B23P 11/00* (2013.01); *B23P 19/00* (2013.01); *B23P 19/02* (2013.01)
USPC ................. 29/243.53; 29/243.54; 29/243.55; 29/243.56; 29/243.57; 29/243.58

(58) Field of Classification Search
CPC ........... B23P 19/00; B23P 11/00; B23P 15/00
USPC ......... 29/243.53–243.58, 243.5; 269/3, 6, 32, 269/228
See application file for complete search history.

(56) References Cited

U.S. PATENT DOCUMENTS

| | | | |
|---|---|---|---|
| 3,942,235 A | 3/1976 | Goodsmith et al. | |
| 4,130,922 A | 12/1978 | Koett | |
| 4,574,473 A * | 3/1986 | Sawdon | 29/798 |
| 5,339,983 A | 8/1994 | Caple | |
| 5,465,868 A | 11/1995 | Bonomi | |
| 5,752,305 A | 5/1998 | Cotterill et al. | |
| 6,592,015 B1 | 7/2003 | Gostylla et al. | |
| 6,631,827 B2 | 10/2003 | Goodsmith et al. | |
| 6,925,698 B2 | 8/2005 | Goodsmith et al. | |
| 6,957,483 B2 | 10/2005 | Woods | |
| 6,968,939 B1 | 11/2005 | Mauer et al. | |
| 7,331,098 B2 * | 2/2008 | Matthews et al. | 29/524.1 |
| 7,475,468 B2 | 1/2009 | Mauer et al. | |
| 7,559,133 B2 | 7/2009 | Chitty et al. | |
| 7,748,097 B1 | 7/2010 | Matthews et al. | |
| 7,752,739 B2 | 7/2010 | Mauer et al. | |
| 7,849,579 B2 | 12/2010 | Craythorn et al. | |
| 2006/0207079 A1 * | 9/2006 | Mauer et al. | 29/243.53 |
| 2007/0274804 A1 * | 11/2007 | Woods | 411/179 |
| 2011/0146455 A1 * | 6/2011 | Simon et al. | 29/525.01 |
| 2011/0173803 A1 | 7/2011 | Naito et al. | |

OTHER PUBLICATIONS

AKH System Manual published or offered for sale prior to Jun. 2011, 17 pages.
AKH FAS-NER Drawing No. WIS-146, Jun. 2011, 1 page.

* cited by examiner

*Primary Examiner* — Lee D Wilson
*Assistant Examiner* — Seahee Yoon
(74) *Attorney, Agent, or Firm* — Price Heneveld LLP

(57) ABSTRACT

A fastener machine is provided. In another aspect, a rivet machine employs a rivet feeding mechanism. A further aspect includes a guide located at an intersection between a feed track and a feed rail with the guide having an angular offset orientation relative to both in order to deter ricocheting of the rivet back into the feed track when the rivet enters the feed rail. Moreover, an aspect of the present machine employs a rocker arm.

30 Claims, 8 Drawing Sheets

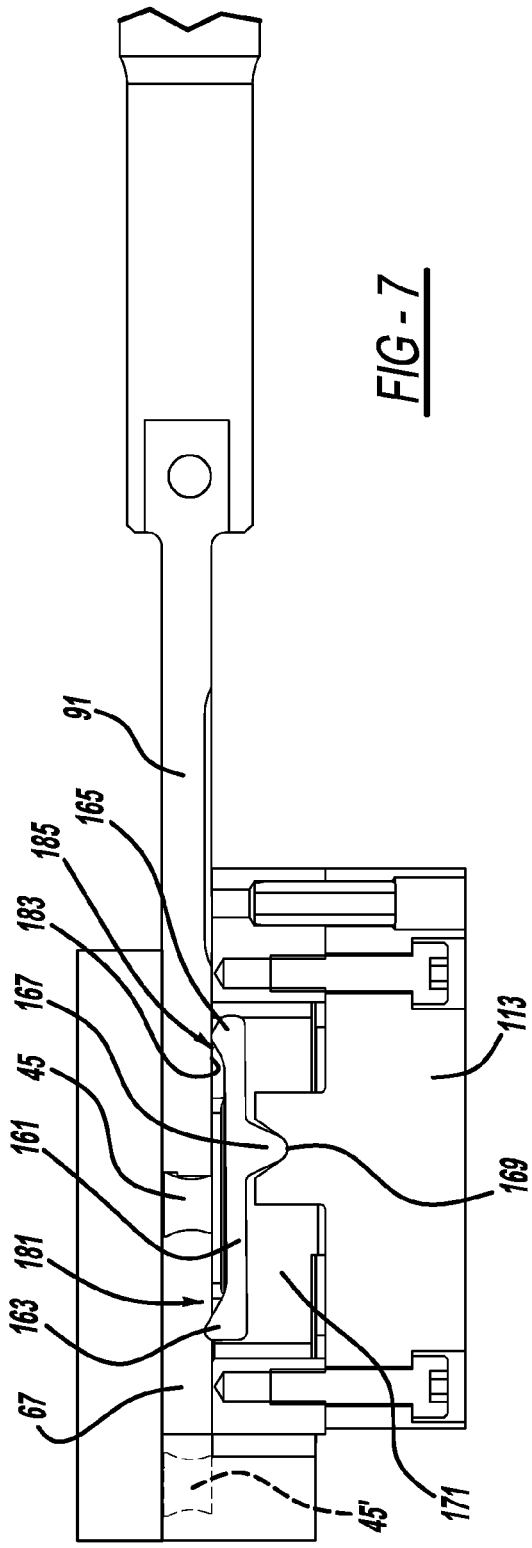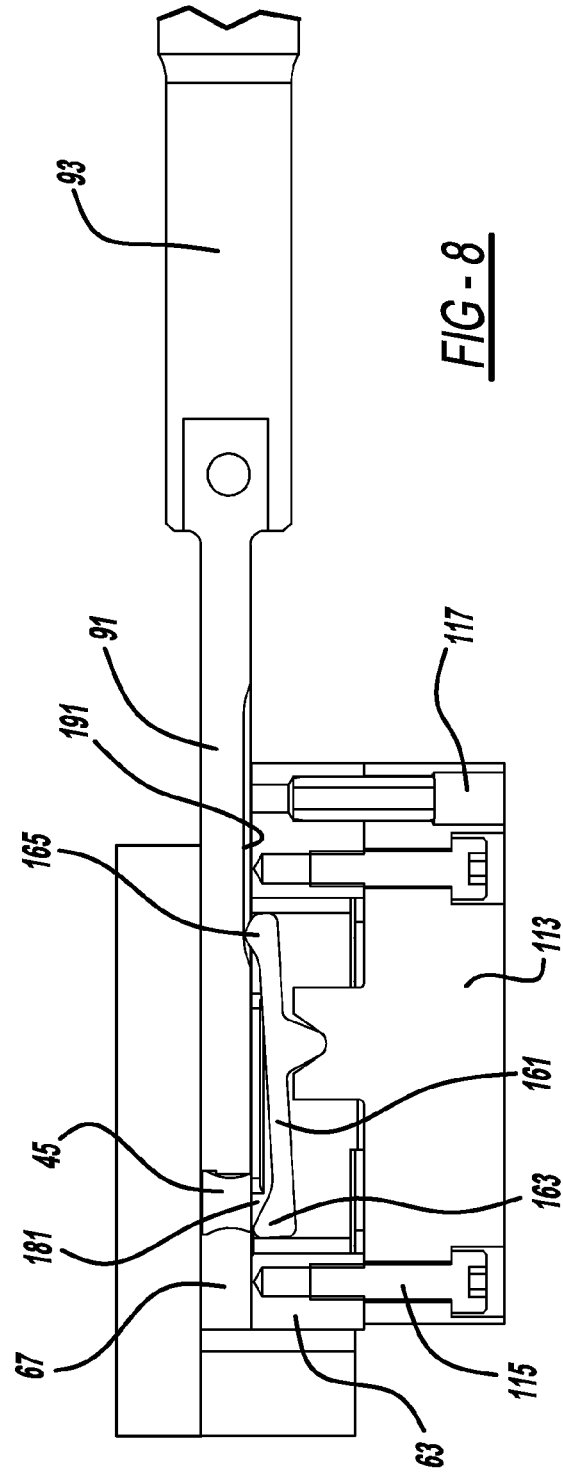

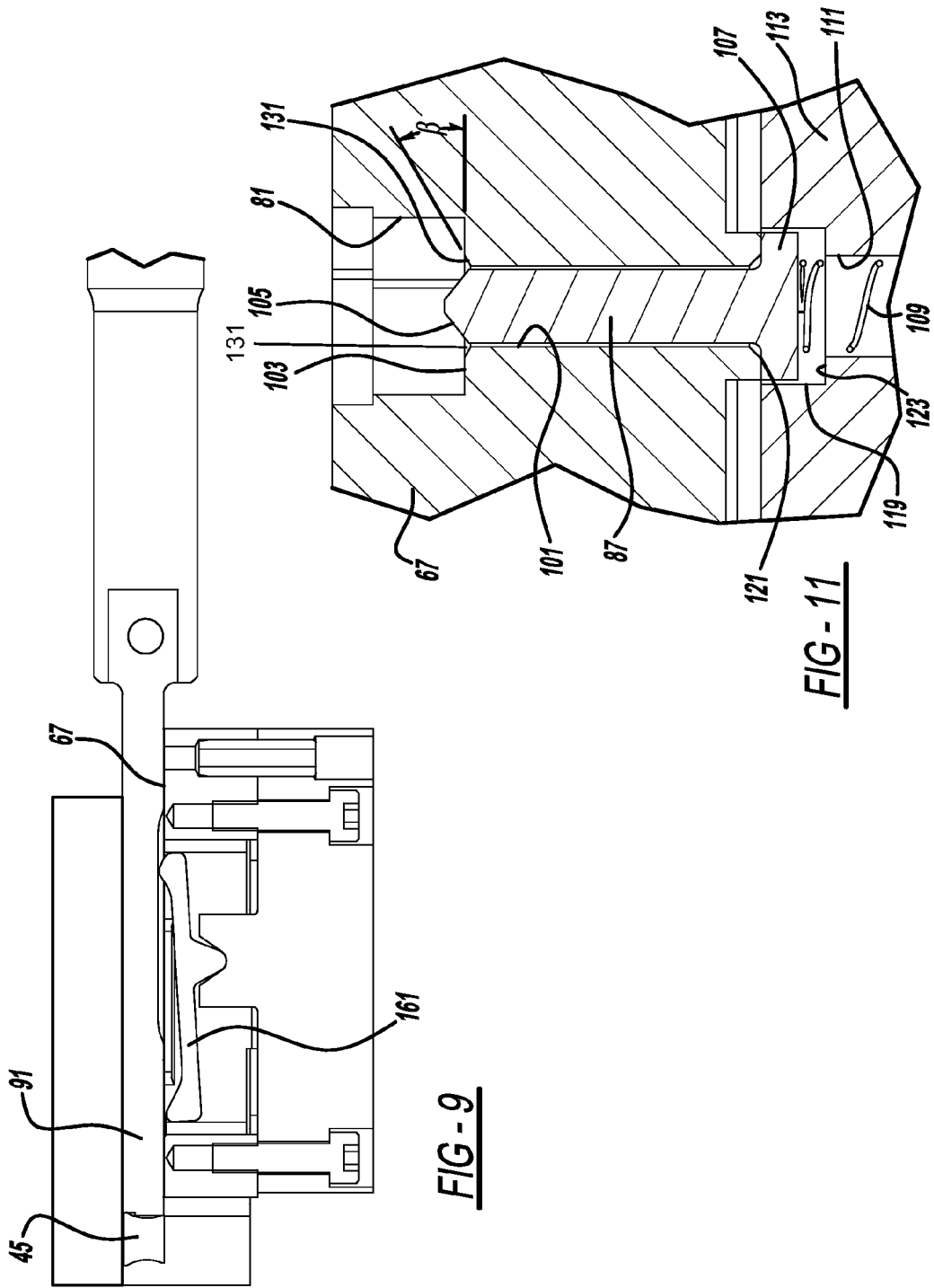

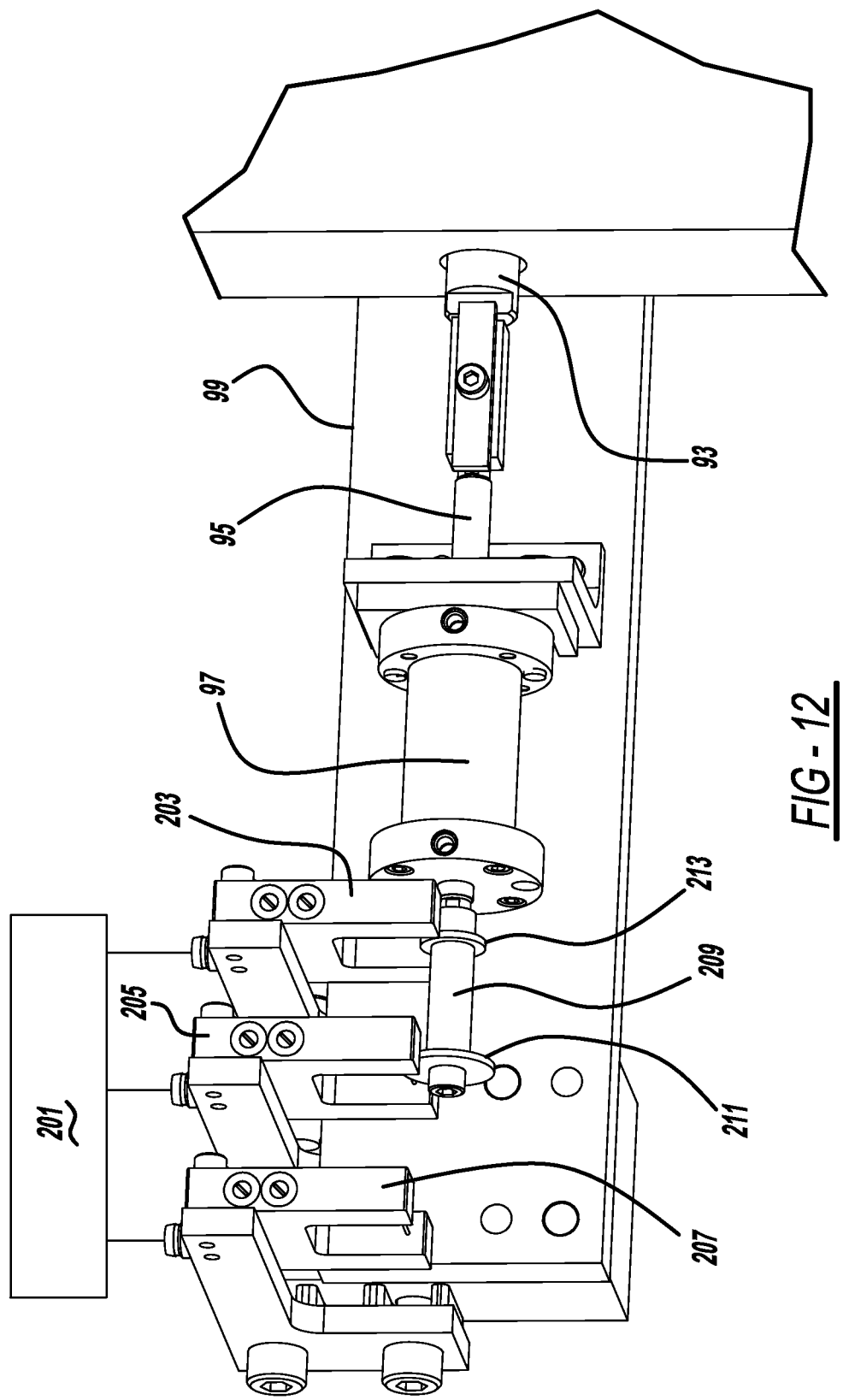

RIVET MACHINE

BACKGROUND AND SUMMARY

This present invention relates generally to a fastener machine and more particularly to a feeding mechanism for a rivet machine.

Various feeding and setting machines have been used for rivets. Such traditional machines are disclosed in U.S. Pat. No. 6,592,015 entitled "Feeding Heads for Fastening Machines" which issued to Gostylla et al. on Jul. 15, 2003, and U.S. Pat. No. 5,752,305 entitled "Self-Piercing Riveting Method and Apparatus" which issued to Cotterill et al. on May 19, 1998. Both of these patents are incorporated by reference herein.

Another conventional, self-piercing rivet setting machine employs a right angled, T-shaped intersection between a guide track and feed rail paths. This causes a pneumatically driven rivet to undesirably bounce back or ricochet off of the abutting wall of the feed rail (e.g., the top of the T) thereby either jamming the feeding mechanism or being out of position for the subsequent advancement of a pusher shaft. Furthermore, this conventional device employs two linearly moveable plungers, one of which is in the guide track path (e.g., stem of the T) and the other of which is in the trailing branch of the feed rail path. These plungers are hollow and each have a height generally the same as the width. Each plunger is depressed against a compression spring until the plunger directly contacts against a conical face of a set screw. The quick advancing movement of the rivet past each plunger causes each plunger to downwardly move at about 30 feet per second which prematurely fatigues the spring after a number of cycles. Moreover, the air pressure can disadvantageously push the rivet past the plunger in the feed rail prior to advancement of the pusher shaft.

In accordance with the present invention, a fastener machine is provided. In another aspect, a rivet machine employs a rivet feeding mechanism. A further aspect includes a guide located at an intersection between a feed track and a feed rail with the guide having an angular offset orientation relative to both in order to deter ricocheting of the rivet back into the feed track when the rivet enters the feed rail. Moreover, an aspect of the present machine employs a rocker arm pivotable adjacent a feed rail with a finger of the rocker arm being moveable through a hole in a channel to selectively limit movement of the rivet in the channel. In another aspect, a biased plunger has: a longitudinally longer aspect ratio relative to its nominal width to deter misalignment or cocking during movement of the plunger, a stop surface abutting a flange of the plunger to deter fatigue of a biasing member, and/or a beveled hole edge to deter tripping of the rivet when the rivet moves past the hole. Yet another aspect of the rivet machine provides at least a return sensor, an advancing sensor, a rivet feed sensor and a controller. A method of using a rivet machine is additionally provided.

Further advantageous and areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIGS. 7-9 are a series of diagrammatic views showing the operation of a rocker arm employed in the feeding mechanism;

FIG. 11 is an enlarged cross-sectional view, like that of FIG. 10, showing the plunger assembly; and FIG. 12 is a perspective view showing sensors employed in the feeding mechanism.

DETAILED DESCRIPTION

Figure 1:
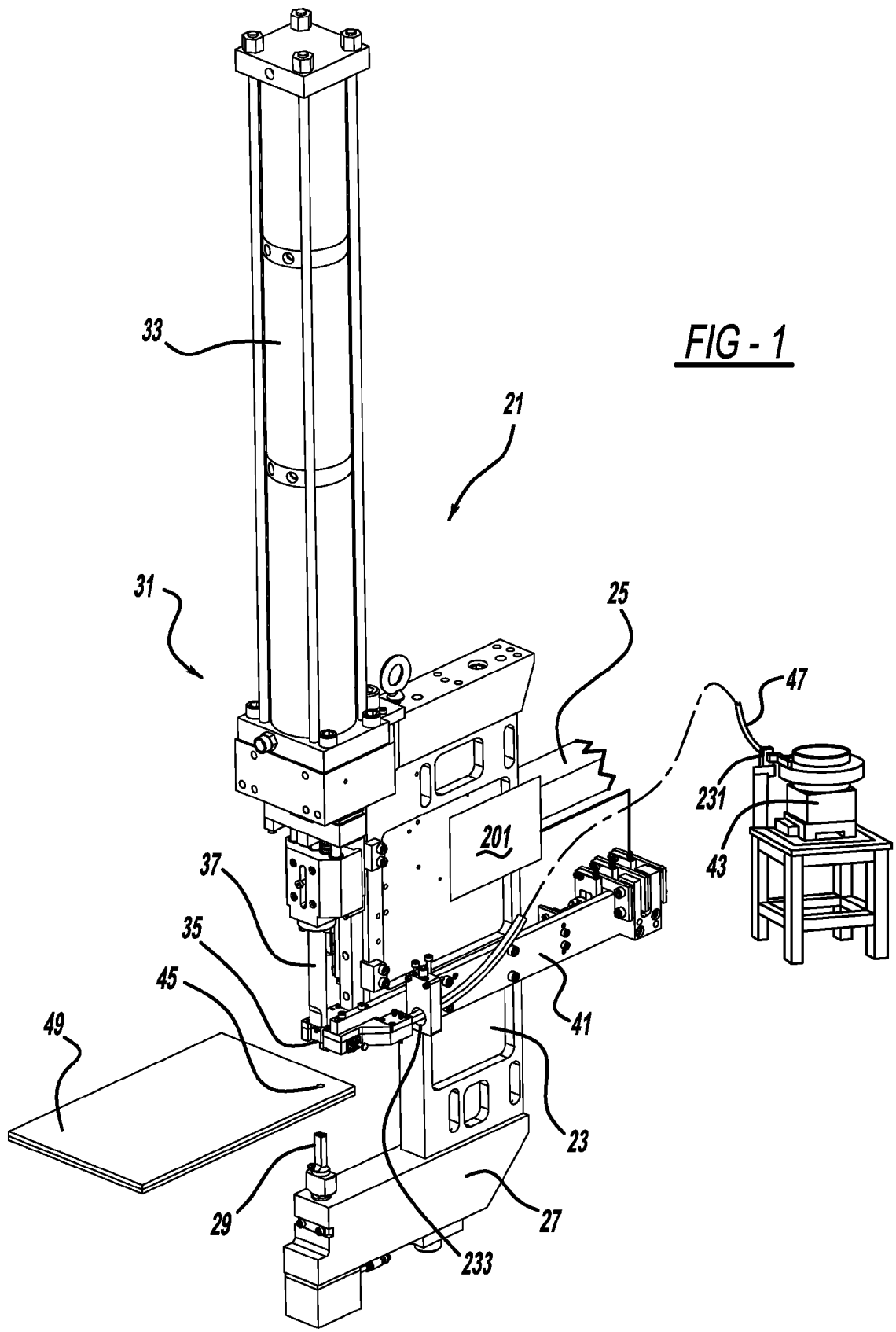
FIG. 1 is a perspective view showing a rivet machine.
Figure 2:
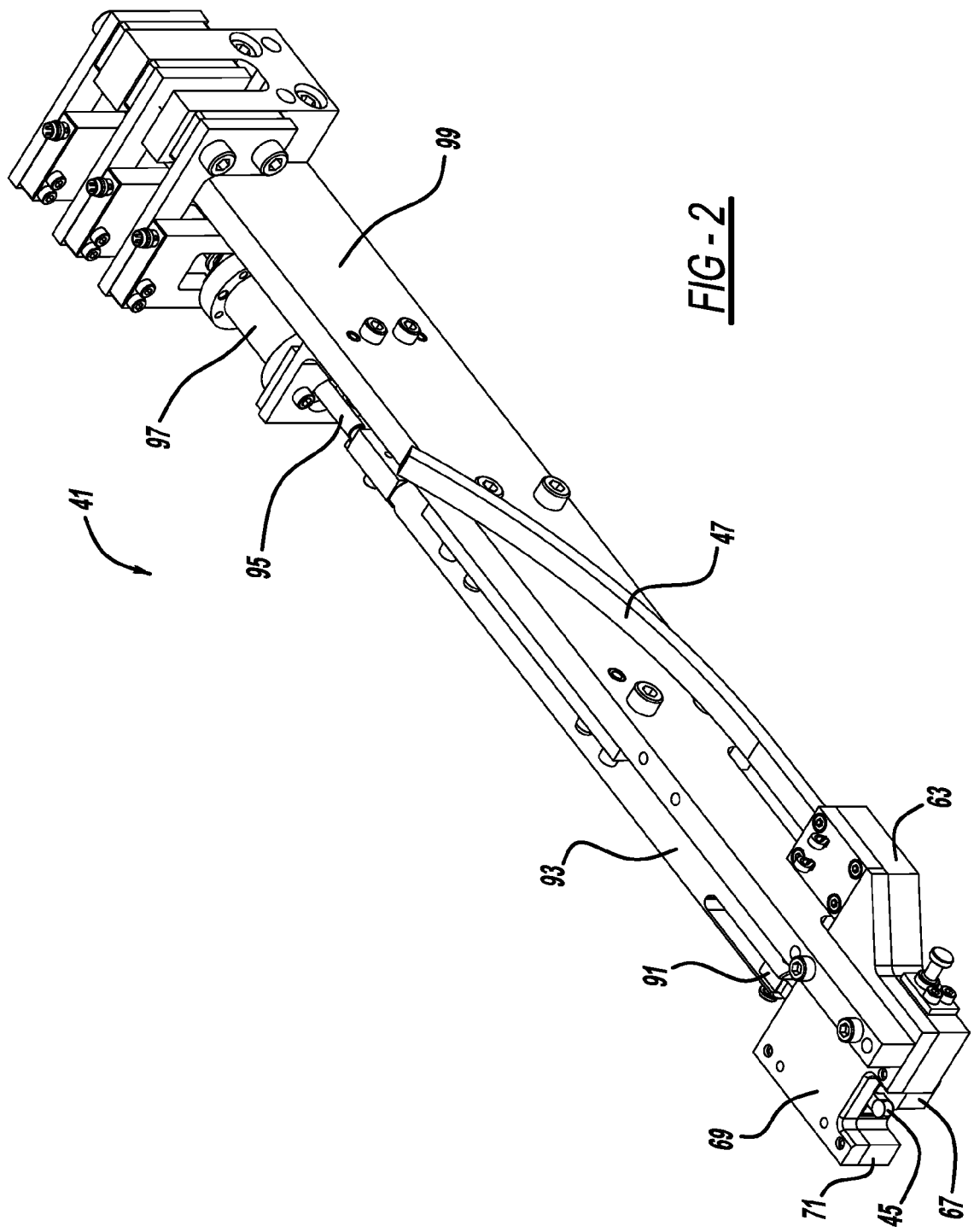
FIG. 2 is a perspective view showing a feeding mechanism employed in the rivet machine.
Figure 3:
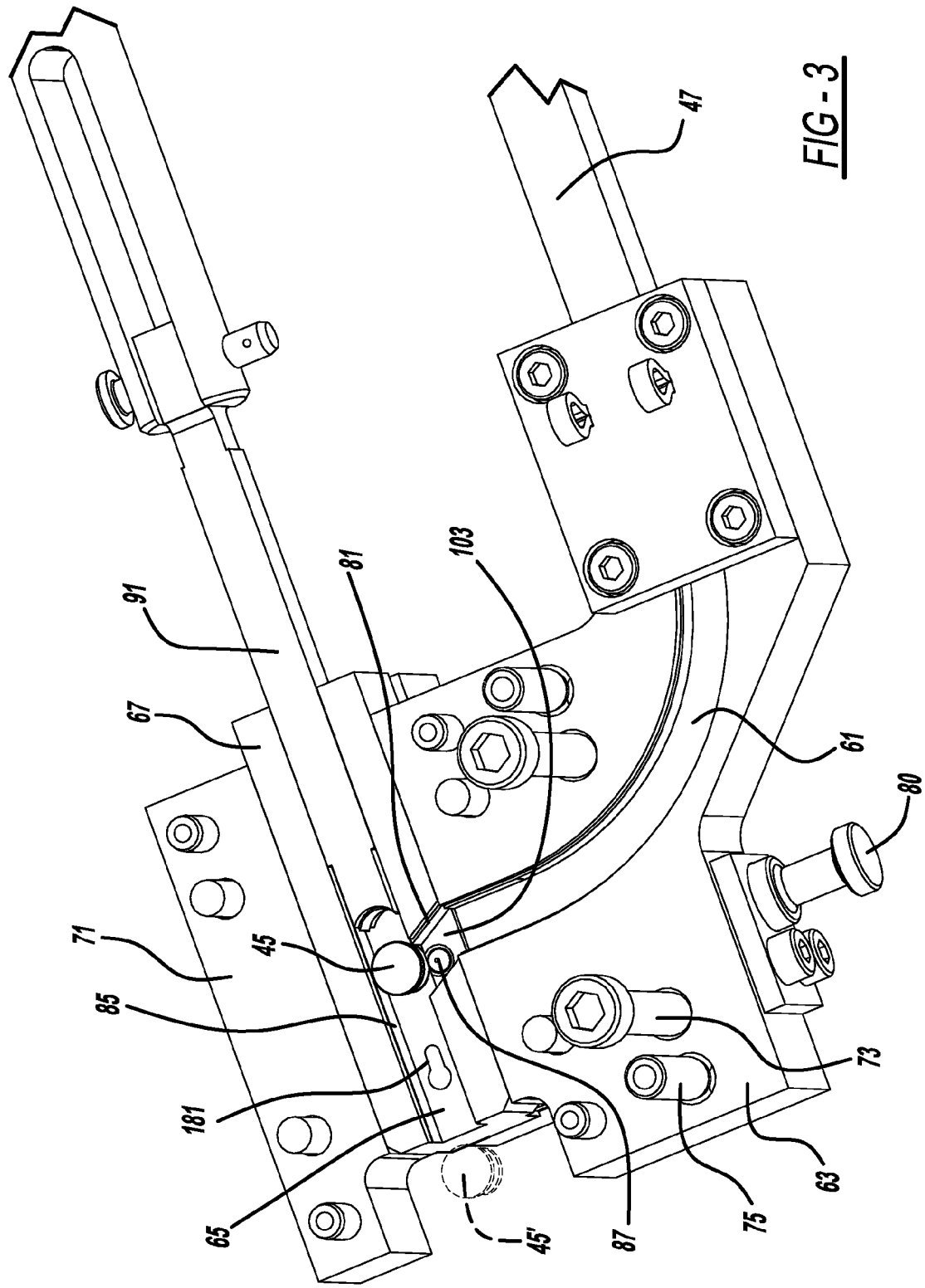
FIG. 3 is a fragmentary perspective view, with a cover removed, showing the feeding mechanism.

Referring to FIG. 1, a rivet setting machine 21 includes a C-frame 23 which is mounted to an articulated robotic arm 25 for automated movement between various operating positions within an industrial factory. An anvil section 27 of C-frame 23 has a die 29 mounted thereon. A ram assembly 31 is mounted to the opposite end of C-frame 23 and includes an air-over-oil fluid actuated cylinder 33, a nose piece 35 and a linearly moving ram 37. Alternately, cylinder 33 can be solely hydraulically, pneumatically, or less preferably, servo-motor actuated. A rivet feeding mechanism 41 is mounted to a generally middle segment of C-frame 23 and is elongated in a direction generally perpendicular to the movement direction of ram 37.

A vibratory bowl 43 supplies individualized fasteners, such as a self-piercing rivet 45, to feeding mechanism 41 via a pneumatically pressurized and flexible hose 47. When multiple workpiece sheets 49 are inserted between ram 37 and die 29, ram 37 will thereafter push and set the rivet into the upper surface of the workpieces as they are being compressed against die 29. Self-piercing rivet 45 is preferably a solid (e.g., not hollow) rivet which punches out a blank or slug from the previously unpunched workpiece areas, whereafter the blanks are withdrawn through an aperture in die 29. The rivet ends are generally flush with the adjacent outside surfaces of workpieces 49. One such self-piercing rivet is disclosed in U.S. Pat. No. 4,130,922 entitled "Headless Riveting System" which issued to Koett on Dec. 26, 1978, which is incorporated by reference herein.

FIGS. 2-6 show further details of feeding mechanism 41. Feeding mechanism 41 includes a curved feed track 61 within a rigid body 63, and a linearly elongated channel 65 within a rigid feed rail 67. A removeable cover 69 is bolted onto body 63 and an oppositely mounting gib 71. Various bolts 73 and dowl pins 75 secure and align cover 69 to body 63. Hose 47 is connected to one end of feed track 61.

Figure 4:
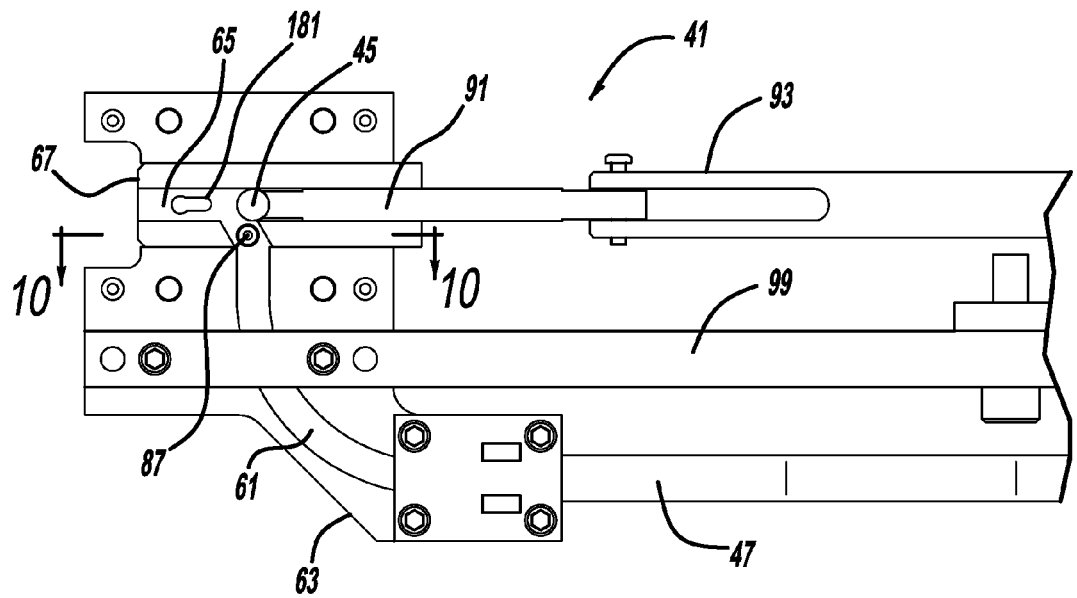
FIGS. 4-6 are a series of elevational views, with the cover removed, showing operation of the feeding mechanism.
Figure 5:
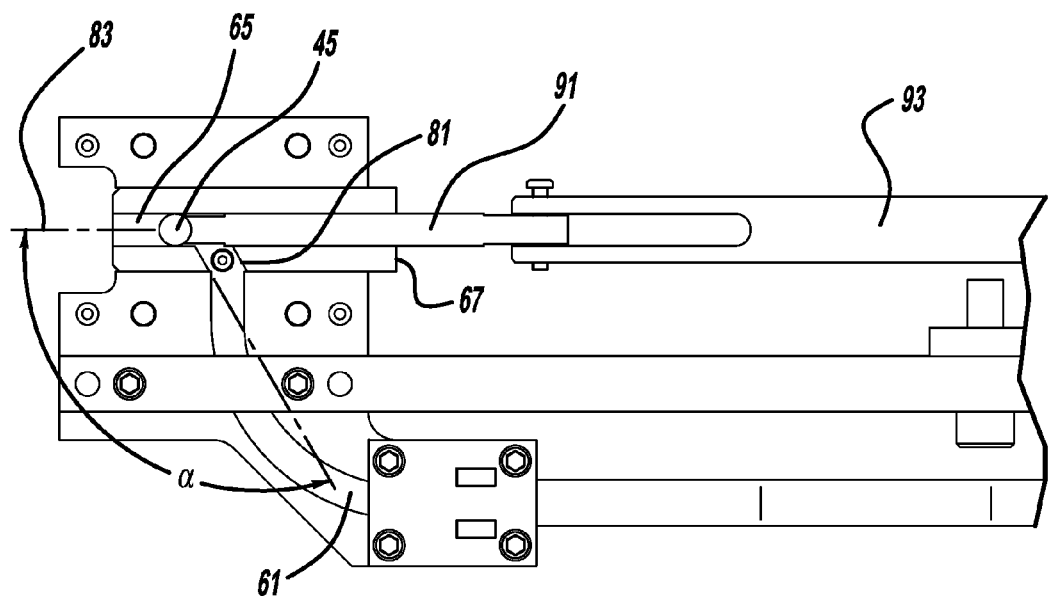
Figure 6:
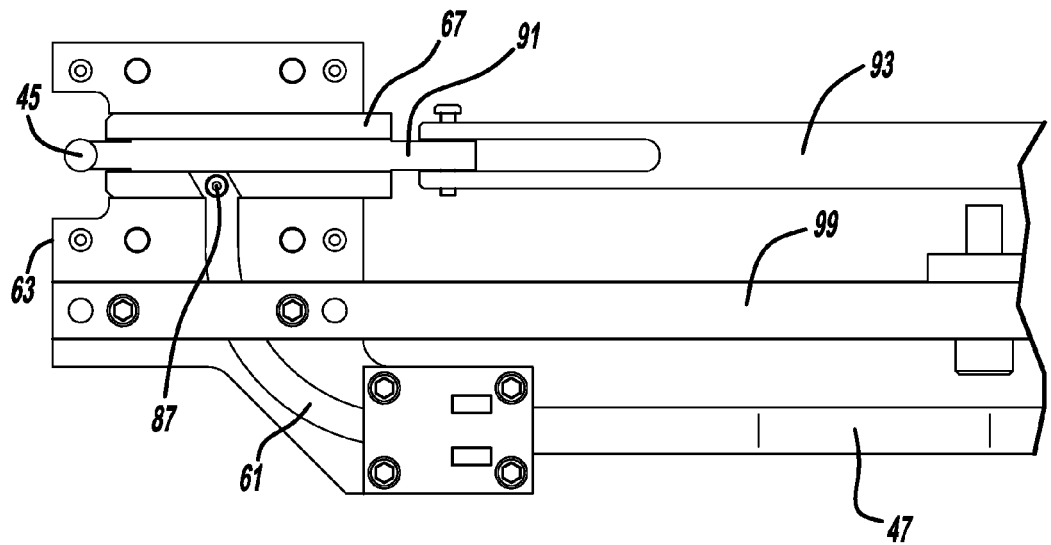
Figure 10:
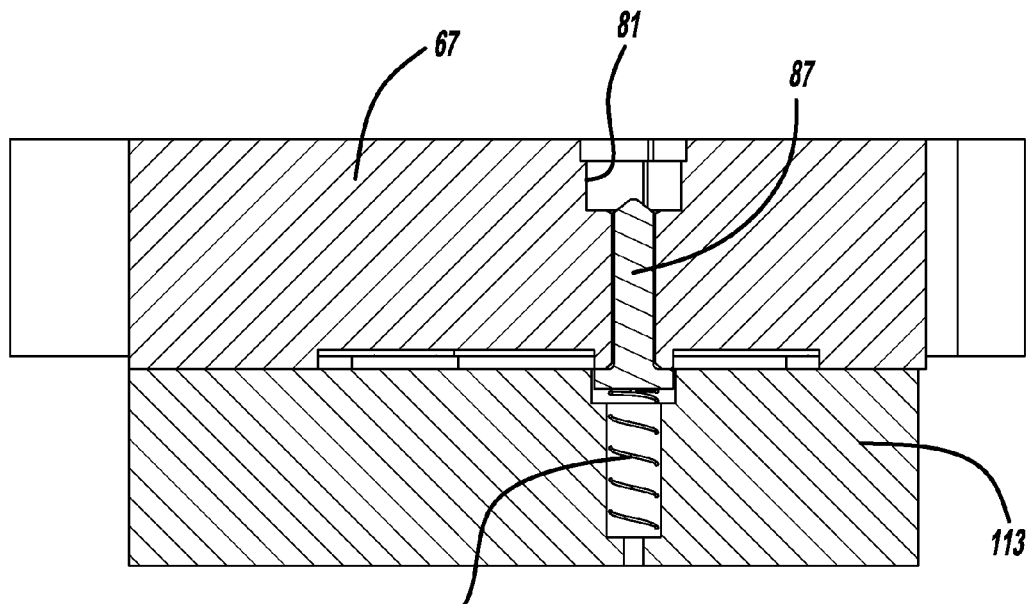
FIG. 10 is a cross-sectional view, taking along line 10-10 of FIG. 4, showing a plunger assembly employed in the feeding mechanism.

A guide 81 is located at an intersection of feed track 61 and feed channel 65, but is angularly offset relative to adjacent sections of both. An angle α between the direction of guide 81 and an elongation direction 83 of feed channel 65 is between 110° and 160°, and more preferably about 120°. This offset configuration deters ricochet or bounce back of rivet 45 when it initially enters feed channel 65 and contacts a back wall 85 thereof. A plunger 87 further urges rivet 45 toward an intermediate and temporary holding position (as shown in FIG. 4) while also deterring movement of rivet 45 back into feed track 61.

Feeding mechanism additionally includes a pusher shaft 91, a tie rod 93 rotatably pinned to shaft 91, a piston rod 95 coupled to tie rod 93, and a pneumatic fluid actuator cylinder 97 which operably advances and retracts pusher shaft 91. Cylinder 97 and body 63 are affixed to a rigid frame 99.

With reference to FIGS. 3, 8, 10 and 11, an elongated hole 101 is positioned in a bottom surface 103 of guide 81. A nominal section of plunger 87 is moveably positioned within hole 101 such that a rounded or frusto-conical distal end 105 thereof projects beyond bottom surface 103 when the plunger is fully extended. The plunger is preferably a solid part. A laterally enlarged and circular flange 107 is located at a proximal end of plunger 87. It is noteworthy that a longitudinal distance from the proximal to distal ends are at least two and more preferably at least three times greater than the diameter width of the nominal section of plunger 87. This aspect ratio helps to align plunger 87 within hole 101 thereby preventing undesired cocking or jamming of the plunger during operation. A compression spring 109 fits within a bore 111 in a retainer block 113 fastened to a bottom of feed rail 67 by bolts 115 and dowl pins 117. An intermediate countersink 119 is provided between hole 101 and bore 111 such that abutment surfaces 121 and 123 contact against the facing surfaces of flange 107 to limit the longitudinal movement of plunger 87. This serves to prevent overcompression and premature fatigue of spring 109. Feed rail 67 is mounted to body 63 by a spring loaded pin 80.

Additionally, a beveled edge 131 is machined at an intersection between hole 101 and bottom surface 103. Such a bevel annularly extends around the periphery of the intersection and preferably has an angle β of 15° to 30° relative to bottom surface 103, and more preferably 30°, but may alternately be rounded. This bevel edge deters tripping or jamming of the rivet when it depresses plunger 87 as it rides over hole 101 in response to the feeding pneumatic pressure. Land is present laterally adjacent hole 101 on bottom surface 103 so as to provide supporting ledges for the rivet.

FIGS. 3 and 7-9, best illustrate a further rivet positioning device of the present feeding mechanism. A rocker arm 161 includes an upwardly projecting finger 163 at a first end and an upwardly projection foot 165 at an opposite end thereof. A fulcrum 167 is positioned in a generally middle section projecting oppositely from finger 163 and foot 165. Fulcrum 167 has a somewhat triangular side view shape, the rounded apex of which is received within a valley 169 of a podium upstanding from retainer block 113. A cavity 171 is present between facing surfaces of retainer block 113 and channel 65 of feed rail 67.

An elongated slot or hole 181 is accessible by cavity 171 and extends through a bottom surface of channel 65 and laterally bordered by supporting ledges. Thus, when rocker arm 161 is pivoted to a rivet holding position as shown in FIG. 7, finger 163 protrudes through hole 181 so as to deter undesired advancement of rivet 45 therepast. In this condition, a nominal underside surface 183 of shaft 91 abuts against foot 165, via hole 185, to maintain the rocker arm 161 in the position shown in FIG. 7 with finger 163 extending into a blocking position in channel 65.

When shaft 91 is advanced to an intermediate position, as shown in FIG. 8, foot 165 of rocker arm 161 is upwardly rotated into a relief gap 191 in rod 91 such that rivet 45 downwardly depresses finger 163 in a detented manner as rivet 45 passes over hole 181. An intersecting edge of hole 181 adjacent the bottom surface of channel 65 is beveled like that illustrated in FIG. 11. Subsequently, FIG. 9 shows rivet 45 advanced to a setting ram-engagement position beyond feed rail 67 and with rocker arm 161 downwardly rotated. Alternately, a pivot pin and/or biasing spring can be used to move the rocker arm, however, such an alternate configuration may not be as cost effective as with the preferred embodiment.

Pushing shaft 91 is preferably machined from AMPCO 18 bronze. This material prevents magnetization of shaft 91 which would otherwise occur if steel. Magnetization would undesireably prevent the shaft from releasing the rivet. Furthermore, plunger 87 and rocker are machined from 6150 steel which is heat treated, hardened and ground to RC 60-63 and RC 50-54, respectively. The feed rail, retaining block and body are machined from M2 steel, which is heat treated, hardened and ground to RC 60-63.

Turning now to FIGS. 1 and 12, multiple sensors are connected to a programmable controller 201, preferably a computer, including non-transient memory such as RAM, ROM, a hard disc drive, removeable memory or the like. A microprocessor uses this stored software and received data to interface with input and output devices such as a keyboard, display screen, warning lights or the like. Programmed software instructions are stored in the memory for receiving sensor signals and making the necessary calculations and determinations as to whether the rivet machine is operating properly and whether an error signal needs to be output.

More particularly, a first sensor is a no-rivet proximity switch 203 which detects if no rivet is present when cylinder 97 actuates the pusher shaft. A second sensor is an in-position proximity switch 205 which detects whether the pusher shaft has fully advanced the rivet. A third sensor is a return proximity switch 207 which detects whether the pusher shaft has fully retracted. A rod 209 extending from a back side of the piston and moveable with the pusher shaft, includes a forward/return flag 211 and a missing rivet flag 213. Flag 211 is sensed by switches 205 and 207 while flag 213 is sensed by switch 203. Switches 203, 205 and 207 are preferably photoelectric sensors such as model BGL 20A-001-S49 which can be obtained from Balluff Inc.

Furthermore, proximity sensors 231 and 233 are positioned adjacent entrance and exit ends of feed tube 47. The tube sensors are preferably of a ring proximity switch type that are connected to controller 201 and used to determine if a rivet has entered and exited tube 47. Tube sensors 231 and 233 send appropriate signals to controller 201 which determines if a rivet has been properly fed through the tube, and prevents multiple rivets from being fed during the same feed cycle in the feeding mechanism to prevent rivet jamming therein. Accordingly, controller 201 will send an error message to an output device if a misfeed has occurred.

The control logic is as follows. Before a rivet is sent to the rivet insertion unit from the bowl feeder, the pusher shaft is in its retracted position which is indicated by the return position photo-electric sensor being activated. Subsequently, when the bowl feeder receives a signal to send a rivet from the controller software, the bowl feeder blows a single rivet through the hose whereby the rivet passes through the first ring sensor which inductively senses the passage of the rivet therethrough and communicates with the software that the bowl feeder actually sent a rivet as so instructed by the software. If no rivet passes through the first ring sensor in a predetermined amount of time, then the controller software will indicate a fault or error that the bowl feeder failed to send a rivet. An operator then must clear this fault before the system will further cycle.

Next, the rivet will pass the second ring sensor at the opposite end of the tube. When the second ring sensor is activated and sends the appropriate signal to the controller software, then the software will cause a cessation of pneumatic pressure into the hose. But if no rivet passes the second inductive ring sensor within a predetermined period of time, the controller software will indicate a fault that the rivet is stuck in the hose. In this event, the operator must clear the fault before the system will cycle.

Furthermore, after the second sensor has indicated that the rivet has traveled through the hose and is in the rivet staging area, the controller software sends a signal to feed a rivet to the nose piece in the ram assembly. In this event, the controller software causes the actuator cylinder to advance the pusher shaft. The pusher shaft accordingly advances until the rivet is pushed into the setting ram-engaging position aligned between the ram and die. The rivet advance-return flag activates the advance photo-electric sensor for a predetermined amount of time (preferably 0.1-0.2 seconds) to ensure that it is in the final position. Once the advance photo-electric sensor has been activated, the pusher shaft is then caused to return by reverse actuation of the cylinder. If no rivet is present then the missing rivet flag activates the associated no-rivet photo-electric sensor and the controller software signals that a fault is caused by the rivets being stuck in the feeding track. Action must be taken to clear this fault before the system will continue to cycle. Moreover, if the pusher shaft is activated and no sensor is activated then there is a rivet jam between the pusher shaft and feed rail which must be cleared before cycle resumption.

While various constructions have been disclosed, other modifications may be made. For example, alternate fasteners can be set by the machine although many of the benefits of the present machine will not be achieved. Furthermore, different types of sensors can alternately be employed but certain advantages may not be realized. Such variations are not to be regarded as a departure from the present invention and all such modifications are intended to fall within the scope of the present invention.

The invention claimed is:

1. A rivet machine comprising:
 a rivet;
 a feed track along which the rivet travels due to pneumatic pressure;
 a feed rail including a linear channel;
 a shaft linearly moveable within the channel to push the rivet toward a setting ram-aligned position after the rivet enters the feed rail, wherein the shaft is nonmagnetizable material; and
 a guide located at an intersection between the feed track and the feed rail, the guide having an angular offset orientation relative to the adjacent section of the feed rail to deter ricocheting of the rivet back into the feed track after the rivet enters the feed rail.

2. The rivet machine of claim 1, wherein the angular orientation of the guide is between 110° and 160° relative to a linear direction of the channel of the feed rail and the guide is also angularly offset from the adjacent section of the feed track.

3. The rivet machine of claim 1, wherein the guide is integrally part of the feed rail and the guide is also angularly offset from the adjacent section of the feed track.

4. The rivet machine of claim 1, wherein the feed track has a curved orientation and is within a rigid metal housing upon which a cover is removeably mounted.

5. The rivet machine of claim 1, wherein the rivet is a self-piercing rivet.

6. The rivet machine of claim 1, wherein the rivet punches a blank from a workpiece within which the blank is set.

7. The rivet machine of claim 1, further comprising a spring biasing a plunger outwardly into the guide to deter the rivet from ricocheting back into the feed track, a longitudinal length of the plunger being at least two times its nominal width, and a flange laterally extending from a side of the plunger to operably abut against a stop surface to deter overcompression of the spring.

8. The rivet machine of claim 1, further comprising:
 a C-frame coupled to a robotic arm;
 a die mounted to one end of the C-frame; and
 a ram coupled to an opposite end of the C-frame;
 the feed rail being coupled to a middle segment of the C-frame with a movement direction of the shaft being substantially perpendicular to a movement direction of the ram; and
 the rivet being set between the ram and the die.

9. The rivet machine of claim 1, further comprising:
 a fluid actuated piston cylinder operably driving the shaft;
 a return sensor operably detecting a retracted position associated with the shaft;
 an advancing sensor operably detecting an advancing position associated with the shaft;
 a rivet feed sensor operably detecting a rivet presence condition;
 the return, advancing and rivet feed sensors all being located on an opposite end of the cylinder from the shaft; and
 a controller receiving signals from the sensors for automatically determining if an undesirable operating condition exists.

10. The rivet machine of claim 1, further comprising a rocker arm pivotable behind the feed rail, a finger of the rocker arm being moveable through a hole in the channel to limit passage of the rivet in the channel, the shaft operably contacting against the rocker arm when the shaft is advanced.

11. A rivet machine comprising:
 a rivet;
 a feed track along which the rivet travels due to pneumatic pressure;
 a feed rail including a channel;
 a mechanical pusher moveable within the channel to advance the rivet toward a setting ram-aligned position after the rivet enters the feed rail;
 a piston actuator operably moving the pusher; and
 a rocker arm pivotable adjacent the feed rail, a finger of the rocker arm being moveable through a hole in the channel to limit passage of the rivet in the channel, the pusher operably contacting against the rocker arm in at least one operating condition, wherein an intersection between the channel of the feed rail and the hole for the finger includes a beveled shape to deter tripping of the rivet when the rivet moves over the hole.

12. The rivet machine of claim 11, wherein the feed track has a curved orientation and is within a rigid metal housing upon which a cover is removeably mounted, and the pusher is a linearly moveable shaft.

13. The rivet machine of claim 11, wherein the rivet is a self-piercing rivet and the at least one operating condition includes when the pusher is advanced.

14. The rivet machine of claim 11, wherein the rivet punches a blank from a workpiece within which the blank is set.

15. The rivet machine of claim 11, further comprising a spring biasing a plunger outwardly to deter the rivet from ricocheting back into the feed track, a longitudinal length of the plunger being at least three times its nominal width, and a flange laterally extending from a side of the plunger to operably abut against a stop surface to deter over-compression of the spring.

16. The rivet machine of claim 11, further comprising:
a C-frame coupled to a robotic arm;
a die mounted to one end of the C-frame; and
a ram coupled to an opposite end of the C-frame;
the feed rail being coupled to a middle segment of the C-frame with a movement direction of the pusher being substantially perpendicular to a movement direction of the ram;
the rivet being set between the ram and the die.

17. The rivet machine of claim 11, wherein the rocker arm further comprises a finger protruding adjacent one end of the lever arm and a foot protruding adjacent the opposite end of the lever arm in substantially the same direction, and a fulcrum protruding from an opposite face of the lever arm, the finger contacting the rivet and the foot contacting the pusher in at least one operating condition.

18. A fastener setting machine comprising:
a fastener;
a feed track along which the fastener travels;
a feed rail;
a mechanical pusher moveable within the feed rail to advance the fastener toward a setting-ram aligned position after the fastener enters the feed rail;
a biasing member;
a plunger moveable in a hole in a surface of a feed path, the biasing member urging the plunger to protrude from the hole, the plunger having a length at least two times as long as its nominal width, and the plunger including a lateral flange;
a stop surface abutting against the flange of the plunger to deter fatigue of the biasing member;
the fastener being deterred from passing the plunger in at least one operating condition and the plunger being depressed by the fastener in another operating condition; and
a rocker arm pivotable behind the feed rail, a finger of the rocker arm being moveable through a hole in the feed rail to limit movement of the fastener in the feed rail, the pusher operably contacting against the rocker arm when the pusher is advanced.

19. The fastener setting machine of claim 18, wherein the feed track has a curved orientation and is within a rigid metal housing upon which a cover is removeably mounted, the feed path being located adjacent an end of the feed track, the end being closest to the feed rail.

20. The fastener setting machine of claim 18, further comprising:
a C-frame coupled to a robotic arm;
a die mounted to one end of the C-frame; and
a ram coupled to an opposite end of the C-frame;
the feed rail being coupled to a middle segment of the C-frame with a movement direction of the pusher being substantially perpendicular to a movement direction of the ram; and
the fastener being set between the ram and the die.

21. The fastener setting machine of claim 18, further comprising:
a fluid actuated cylinder operably driving the pusher;
a return sensor operably detecting a retracted position associated with the pusher;
an advancing sensor operably detecting an advancing position associated with the pusher;
a fastener feed sensor operably detecting a fastener presence condition associated with the pusher;
the return, advancing and fastener feed sensors all being located adjacent an opposite end of the cylinder from the pusher; and
a controller receiving signals from the sensors for automatically determining if an undesirable operating condition exists.

22. The fastener setting machine of claim 18, further comprising an intersection between the hole and the feed path having a non-square shape consisting of: (a) a chamfer or (b) a radius, to deter tripping of the fastener when it moves over the hole.

23. The fastener setting machine of claim 18, wherein the fastener is a rivet which is pneumatically fed along the feed track.

24. The fastener setting machine of claim 18, wherein the fastener is a self-piercing rivet which punches a blank in workpieces attached thereto.

25. A rivet machine comprising:
a rivet;
a feed rail including a linear channel;
an elongated shaft operably pushing the rivet along the channel toward a setting ram-aligned position, the shaft being a magnetically inert material;
a fluid actuated cylinder operably advancing and retracting the shaft;
a return sensor operably detecting a retracted position associated with the shaft;
an advancing sensor operably detecting an advanced position associated with the shaft;
a rivet feed sensor operably detecting a rivet presence condition associated with the shaft;
the return, advanced and rivet feed sensors all being located adjacent an opposite end of the cylinder from the shaft; and
a controller receiving signals from the sensors for automatically determining if an undesirable operating condition exists.

26. The rivet machine of claim 25, further comprising a rigid feed track along which the rivet travels due to pneumatic pressure, the rivet moving from the feed track to the feed rail when the shaft is retracted.

27. The rivet machine of claim 26, further comprising:
a flexible hose connected to the feed track; and
sensors associated with ends of the hose to determine if the rivet has entered and exited the hose.

28. The rivet machine of claim 25, wherein the rivet is a self-piercing rivet.

29. The rivet machine of claim 25, further comprising:
a C-frame coupled to a robotic arm;
a die mounted to one end of the C-frame; and
a ram coupled to an opposite end of the C-frame;
the feed rail being coupled to a middle segment of the C-frame with a movement direction of the shaft being substantially perpendicular to a movement direction of the ram; and
the rivet being set between the ram and the die.

30. A method of using a rivet machine, the method comprising:
(a) pneumatically moving a fastener from a first feed path to an offset angled second feed path;
(b) the fastener depressing and riding over a biased plunger during step (a): and
(c) deterring bounce back of the fastener by causing the fastener to enter the second feed path at an angle between 110° and 160° relative to an elongated orientation of the second feed path;

(d) mechanically pushing the fastener along the second feed path after step (c);
(e) the fastener pivoting and riding over a rocker arm during step (d); and
(f) advancing a ram to set the fastener into a workpiece.

* * * * *

UNITED STATES PATENT AND TRADEMARK OFFICE
CERTIFICATE OF CORRECTION

PATENT NO.         : 8,769,788 B2                                  Page 1 of 1
APPLICATION NO.    : 13/162974
DATED              : July 8, 2014
INVENTOR(S)        : William M. Faitel et al.

It is certified that error appears in the above-identified patent and that said Letters Patent is hereby corrected as shown below:

In the Specification:

Column 1, line 61;
    "advantageous" should be --advantages--.
Column 2, line 13;
    "taking" should be --taken--.
Column 2, line 58;
    "dowl" should be --dowel--.
Column 3, line 23;
    "dowl" should be --dowel--.

In the Claims:

Column 6, claim 8, line 11;
    Delete "and".
Column 7, claim 16, line 6;
    Delete "and".
Column 7, claim 16, line 11;
    Insert --and-- after "ram;".
Column 7, claim 20, line 52;
    Delete "and".
Column 8, claim 25, line 33;
    "advanced" should be --advancing--.
Column 8, claim 29, line 51;
    Delete "and".
Column 8, claim 30, line 63;
    ":" should be --;--.

Signed and Sealed this
Twentieth Day of January, 2015

Michelle K. Lee
*Deputy Director of the United States Patent and Trademark Office*